L. BARTMANN.
SIGNALING APPARATUS FOR MOTOR VEHICLES.
APPLICATION FILED FEB. 2, 1916.
1,355,882.
Patented Oct. 19, 1920.
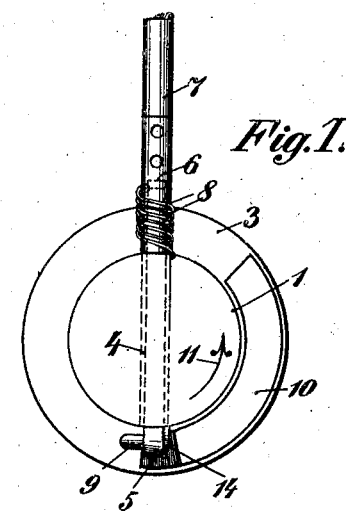
Fig. 1.
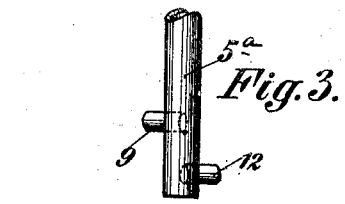
Fig. 3.
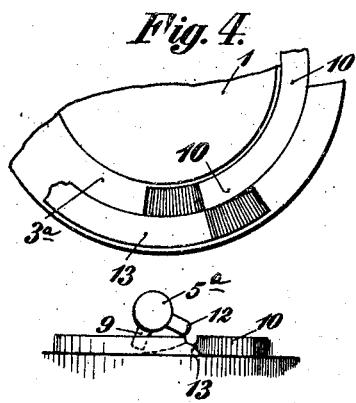
Fig. 4.
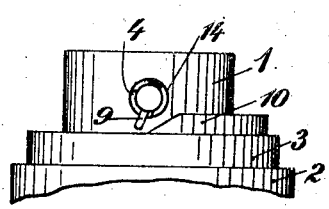
Fig. 2.
Fig. 5.
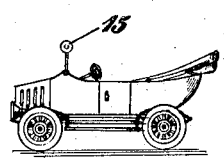
Fig. 6.
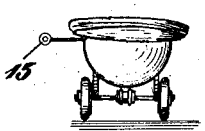
Fig. 6ª
Inventor:
Ludwig Bartmann

UNITED STATES PATENT OFFICE.

LUDWIG BARTMANN, OF SCHÖNEBERG-BERLIN, GERMANY, ASSIGNOR TO HERMANN STOBWASSER, OF BERLIN, GERMANY.

SIGNALING APPARATUS FOR MOTOR-VEHICLES.

1,355,882.  Specification of Letters Patent.  Patented Oct. 19, 1920.

Application filed February 2, 1916. Serial No. 75,789.

*To all whom it may concern:*

Be it known that I, LUDWIG BARTMANN, a citizen of the German Empire, and resident of Schöneberg-Berlin, Germany, have invented a certain new and useful Improvement in Signaling Apparatus for Motor-Vehicles, of which the following is a specification.

This invention relates to signaling apparatus of the type employed on motor vehicles for indicating the contemplated change in the direction of travel of the vehicle.

The invention has as its main object to provide a signaling device which when its signaling arm is in inoperative position cannot readily be seen by an occupant of a following vehicle, but which is in full view when it is in signaling position.

My improved device is simple in construction, and efficient in operation.

The above and other objects of my invention are obtained in the structure described in the following specification and illustrated in the accompanying drawings, wherein—

Figure 1 is a front elevation of my signaling device, the outer end of the semaphore arm being broken away.

Fig. 2 is a bottom plan view of the device shown in Fig. 1.

Fig. 3 is a partial view of the inner end of a modified form of semaphore arm.

Fig. 4 is a view similar to Fig. 1, showing a modified form of construction.

Fig. 5 is a bottom plan view of the modified construction shown in Fig. 4.

Fig. 6 is a side view of an automobile showing my device applied thereto, the semaphore arm being illustrated in inoperative position.

Fig. 6ª is a rear view of an automobile showing the semaphore arm in operative position.

Referring to the drawings, wherein like numerals represent like parts in the several views, and particularly to the embodiment of my invention shown in Figs. 1 and 2, 1 designates a revoluble plug or shaft which lies in a horizontal plane and extends longitudinally of the vehicle to which my device is attached. The revoluble plug may be mounted in any suitable bearing. In the present instance, I have shown it mounted in a tubular bearing or sleeve 3 secured to the base 2. The plug may be provided with any suitable means for revolving the same.

The shaft or plug 1 is provided with a transverse opening, in which is mounted a tube or pipe 4, the pipe, as shown in Fig. 1, being extended at one end beyond the plug. Extending through the tube 4 is a rod 5 to which the semaphore arm 7 is secured by means of the coupling section 6. Surrounding the lower end of the arm 7 or the coupling section 6 is a coil spring 8, connected at one end to the tube 4 and at the other end to the semaphore arm. This spring serves to rotate the arm about its own axis when the arm is moved from the outstanding position shown in Fig. 6ª to the inoperative position shown in Fig. 6. The rod 5 to which the semaphore arm is secured protrudes at its lower end from the tube 4, and this end is provided with a radially extending finger or pin 9.

The sleeve 3 is provided on its upper face with an arcuate rib 10, which rib, at one end, inclines downwardly to the surface of the sleeve. The semaphore arm at its outer end carries a signaling disk 15.

The operation of the device shown in Figs. 1 and 2 will be readily understood from the foregoing description. When the device is in inoperative position, that is, in the position shown in Fig. 6, the semaphore arm is in a vertical position, and the disk 15 is in a vertical plane parallel to or coincident with the longitudinal axis of the automobile. Therefore, the semaphore cannot be readily observed by an occupant of a following vehicle. When it is desired to move the arm 7 into operative position, the shaft 1 is rotated in the direction of the arrow 11, Fig. 1, through an angle of 90°, and upon so rotating the shaft, the pin 9 will ride up the inclined surface of the rib 10 to the upper surface thereof, and thereby the rod 7 will be rotated about its own axis through an angle of substantially 90°. During this rotation the spring 8 is placed under tension. The disk 15, when in operative position, is in a vertical plane passing transversely through the automobile as shown in Fig. 6ª, and, of course, the chauffeur of a following car can readily see said disk. When it is desired to move the arm into inoperative position, the shaft 1 is moved in a reverse direction through an angle of 90°. The finger 9 rides over the inclined surface at the end of the rib 10, with the result that the coil spring which was placed under tension by the original movement of the parts turns the arm 7 about its own axis through an angle of 90°, back to its original position, further movement of the arm being prevented, however, by the engagement of the end of the pin 9 against the face of the sleeve 3. The lower end of the tube 4 may be provided with a projection 14, the sides of which are adapted to be engaged by the finger 9 and act as stops for limiting the turning movement of the semaphore arm in opposite directions.

Referring now to Figs. 3 to 5, wherein I have shown a slightly modified structure, the sleeve 3ª instead of having a single rib is shown as having a pair of ribs 10 and 13, the adjacent ends of these ribs being oppositely inclined as clearly shown in Figs. 4 and 5. It will be noted that the upper ends of the inclined surfaces of the ribs 10 and 13 are on the same radial line.

In this embodiment, the spring 8 is omitted, and the lower or inner end of the rod 5ª instead of having a single pin or finger 9 is provided with an additional finger 12. The finger 9 is adapted to ride up or along the inclined surface of the rib 10 when the shaft 1 is turned in one direction, while the pin 12, which is at an angle to the pin 9, is adapted to ride up or along the inclined surface of the rib 13 when the shaft 1 is turned in the opposite direction.

With the semaphore arm 5ª in its raised position, the operation is as follows: Upon turning the shaft 1 to the left the finger 9 is caused to engage and ride along the inclined surface of the rib 10, thus turning the arm 5ª on its axis through an arc of 90°. During this axial turning movement of the semaphore arm the finger 12 is moved downwardly or inwardly along the inclined surface of the rib 13 until it reaches the face of the bearing sleeve 3ª. To return the semaphore arm to its normal or inoperative position the shaft 1 is turned to the right. The finger 12 now becomes operative to turn the arm 5ª in a direction opposite to that in which it was turned by the finger 9. The said finger 12 rides up or along the inclined surface of the rib 13, and causes a positive rotation or axial turning movement of the arm 5ª through an arc of 90° returning the latter to the position shown in Fig. 6 of the drawings, in which the signaling disk 15 lies in a plane parallel to or coincident with the axis of the automobile upon which the device is mounted.

What I claim is:

1. In a signaling device for motor vehicles, a signaling arm carrying a disk which when in inoperative position lies in a vertical plane passing longitudinally through the motor vehicle and which when in operative position lies in a vertical transverse plane, the said arm being mounted for swinging movement in a vertical transverse plane, means for axially rotating said arm in one direction while swinging outwardly about its pivot point, and means for axially rotating said arm in the other direction while swinging back to its normal position.

2. In a device of the class described, a semaphore arm mounted for swinging movement in a vertical transverse plane, a rotatable member to which said arm is connected, a fixed cam surface, means carried by the arm adapted during the swinging movement thereof to ride upon said cam surface for rotating the arm in one direction about its own axis when the rotatable member is rotated, and separate means for rotating said arm in the opposite direction.

3. In a device of the class described, a semaphore arm having a disk adapted when in inoperative position to lie in a vertical plane passing longitudinally through the motor vehicle to which it is attached and adapted to lie in a vertical transverse plane when in operative position, means for swinging said arm from a vertical to a horizontal position, means for rotating said arm about its own axis in one direction, and means for rotating said arm about its own axis in the other direction.

4. In a device of the class described, a revoluble member, a semaphore arm axially rotatable in, and mounted to swing in a transverse plane with said member, a stationary cam surface, a finger on the arm adapted to ride upon said cam surface during the swinging movement of said arm for rotating the arm in one direction about its own axis when said member is revolved, and a spring acting on said arm for rotating it in the opposite direction.

5. In a device of the class described, a rotatable shaft having a transverse opening, a semaphore arm rotatably mounted in said opening, a cam surface, a finger on the arm adapted to engage said cam surface to rotate the arm in one direction about its own axis when the rotatable member is rotated, and a spring acting upon said arm for rotating it in the opposite direction.

6. In a device of the class described, a rotatable shaft having a transverse opening, a semaphore arm rotatably mounted in said opening, a cam surface, and a finger on the arm adapted to engage said cam surface to rotate the arm about its own axis when the rotatable member is rotated in one direction, and means for returning the arm to its original position when the member is rotated in the opposite direction.

7. In a device of the class described, a signaling arm, means for rotating said arm from one vertical plane to another vertical plane transverse to the first plane, and means for rotating said arm in the opposite direction to return it to its original position.

In testimony whereof I affix my signature in the presence of two witnesses.

LUDWIG BARTMANN.

Witnesses:
HENRY HASPER,
ARTHUR SCHROEDER.